(12) United States Patent
Fish et al.

(10) Patent No.: US 7,980,762 B2
(45) Date of Patent: Jul. 19, 2011

(54) HYBRID BEARING CYLINDER

(75) Inventors: Elson B. Fish, Lakeville, IN (US); Paul H. Lashbrook, South Bend, IN (US); Scott Farrisee, South Bend, IN (US); James Shobert, Zionsville, IN (US)

(73) Assignee: Polygon Company, Walkerton, IN (US)

( * ) Notice: Subject to any disclaimer, the term of this patent is extended or adjusted under 35 U.S.C. 154(b) by 634 days.

(21) Appl. No.: 11/868,363

(22) Filed: Oct. 5, 2007

(65) Prior Publication Data

US 2008/0081136 A1    Apr. 3, 2008

Related U.S. Application Data

(63) Continuation-in-part of application No. 11/566,535, filed on Dec. 4, 2006, now Pat. No. 7,278,788, which is a continuation of application No. 10/165,237, filed on Jun. 7, 2002, now abandoned.

(51) Int. Cl.
*F16C 29/02*    (2006.01)

(52) U.S. Cl. ............................................. 384/42; 384/29
(58) Field of Classification Search .................... 384/26, 384/29, 42, 298; 156/174; 92/170.1
See application file for complete search history.

(56) References Cited

U.S. PATENT DOCUMENTS

| | | | | |
|---|---|---|---|---|
| 3,530,772 A | * | 9/1970 | Mori | 92/170.1 |
| 3,695,149 A | * | 10/1972 | Eberhart | 92/170.1 |
| 4,449,446 A | * | 5/1984 | Degnan et al. | 92/171.1 |
| 4,697,499 A | * | 10/1987 | Dirkin et al. | 92/170.1 |
| 5,131,818 A | * | 7/1992 | Wittkop et al. | 92/170.1 |
| 7,278,788 B2 | * | 10/2007 | Fish et al. | 384/42 |

* cited by examiner

*Primary Examiner* — Thomas R Hannon
(74) *Attorney, Agent, or Firm* — Barnes & Thornburg LLP; Mark J. Nahnsen

(57) ABSTRACT

A hybrid bearing cylinder having a composite sleeve and a metallic jacket positioned around the composite sleeve and secured thereto. The hybrid bearing cylinder is adapted to be secured to metallic cylinder end caps by threading, welding, swaging or other metal attachment methods.

10 Claims, 7 Drawing Sheets

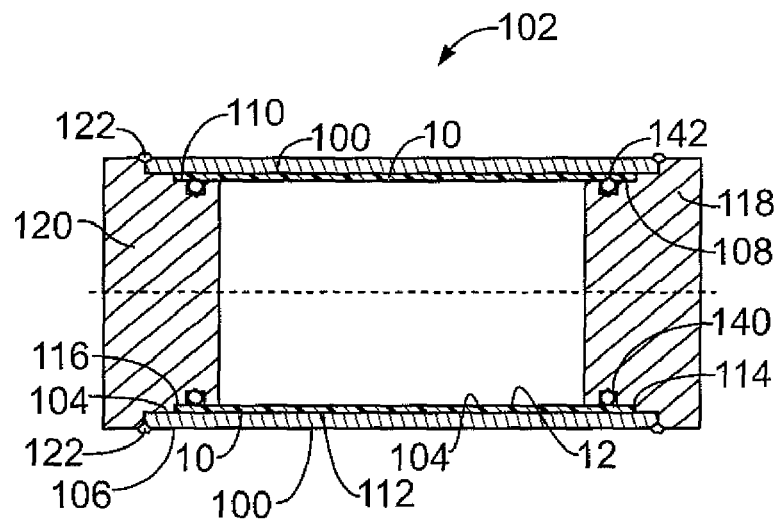
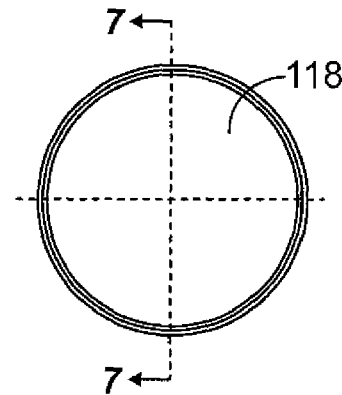
FIG. 7  FIG. 6
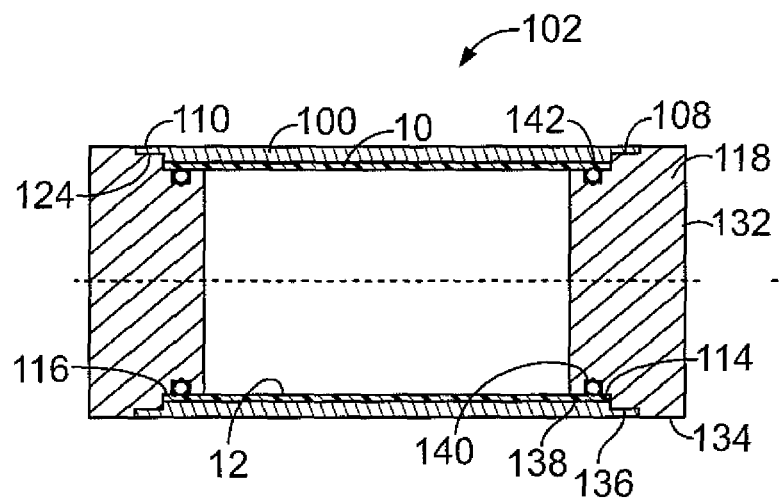
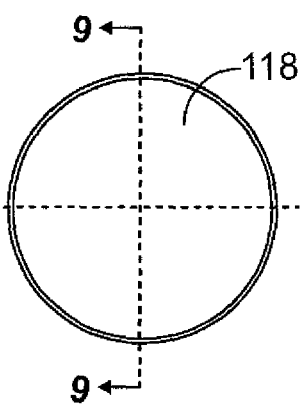
FIG. 9  FIG. 8

HYBRID BEARING CYLINDER

CROSS REFERENCE TO RELATED APPLICATIONS

This application is a continuation-in-part application to copending U.S. application Ser. No. 11/566,535, filed Dec. 4, 2006, which is a Continuation of U.S. application Ser. No. 10/165,237, filed Jun. 7, 2002, which are expressly incorporated by reference herein in their entirety.

BACKGROUND

The present disclosure relates to bearing members, and, in particular, to cylinders having an inner bearing surface, and relates to a method of making such a cylinder.

SUMMARY

According to the present disclosure, a bearing cylinder is formed to include a tubular structure having an inner bearing surface, an outer surface and first and second ends.

In illustrative embodiments, the bearing cylinder includes a composite sleeve that is made from a composite material that is formed from a resin matrix and includes an inner bearing surface. The composite sleeve includes a filament material that is helically embedded in the resin matrix. The resin matrix is composed of a resin material having fumed silica therein. A layer of the resin material is located at the inner bearing surface.

In illustrative embodiments, the composite bearing cylinder is positioned within a metallic jacket. The metallic jacket surrounds the bearing cylinder and is secured to the composite bearing cylinder by press fitting, thermal expansion/contraction, bonding, or by use of metal forming methods such as swaging, roll forming, or by use of a drawing process. The resultant hybrid bearing cylinder can be secured to metallic cylinder end caps by use of threading, welding, swaging or other metal attachment methods.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The present invention and the advantages thereof will become more apparent upon consideration of the following detailed description when taken in conjunction with the accompanying drawings of which:

FIG. 6 is an end view of a hybrid bearing cylinder;

FIG. 7 is a cross section of the hybrid bearing cylinder taken along line 7-7 of FIG. 6 showing the composite bearing cylinder positioned within the metallic jacket and also showing the metallic jacket being secured to a pair of end caps by welding;

FIG. 8 is an end view of a hybrid bearing cylinder;

FIG. 9 is a cross section of the hybrid bearing cylinder taken along line 9-9 of FIG. 8 showing the composite bearing cylinder positioned within the metallic jacket and also showing the metallic jacket being secured to a pair of end caps by threads positioned at the ends of the metallic jacket;

DETAILED DESCRIPTION

Figure 1:
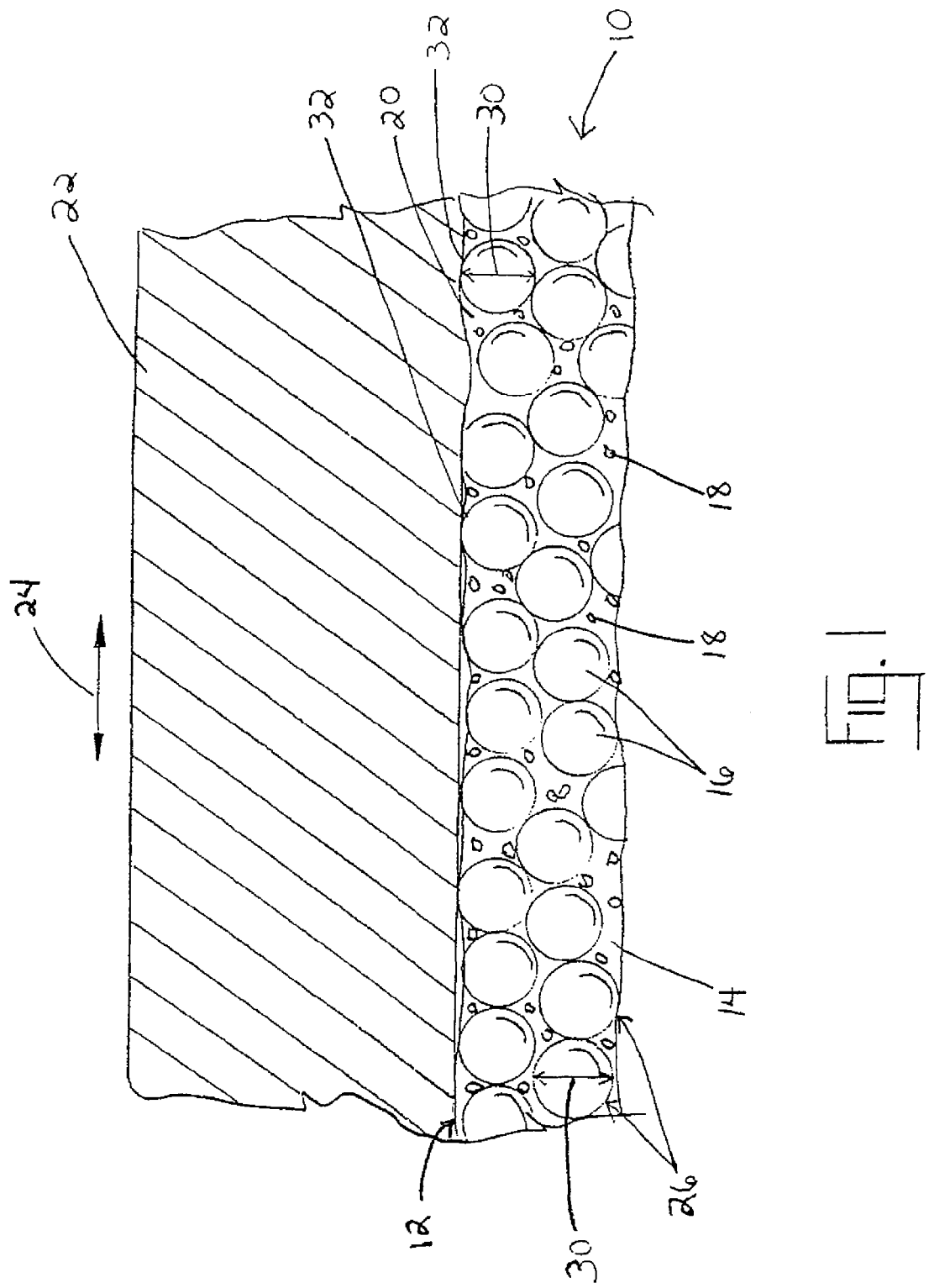
FIG. 1 is a partial, cross-sectional view of the hybrid bearing cylinder of the present invention.
Figure 2:
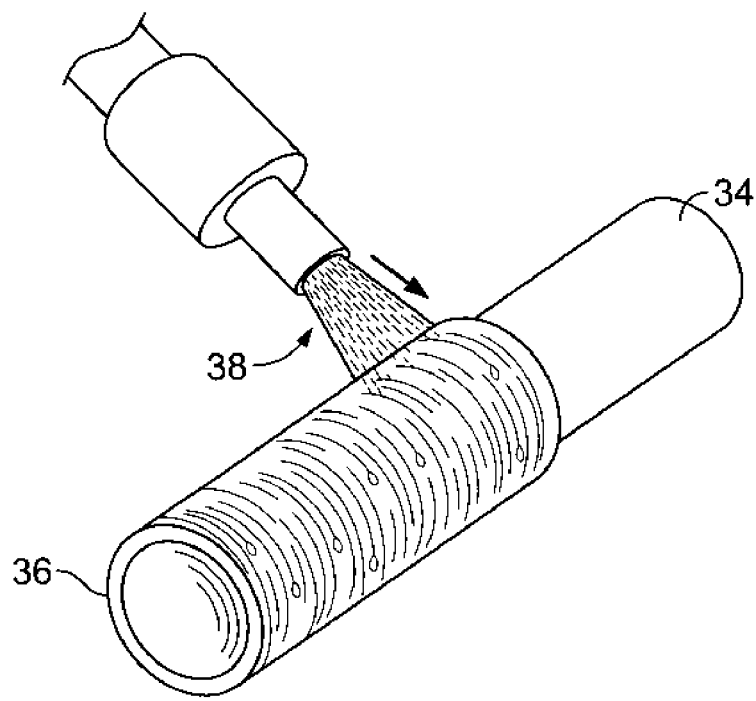
FIGS. 2-4 illustrate a series of steps used in producing the hybrid bearing cylinder of the present invention.

Referring now to the drawings, and more particularly to FIG. 1, there is shown a composite sleeve 10 having an inner surface 12. Composite sleeve 10 includes a resin matrix 14 with a continuous filament material 16 and, optionally, a plurality of particulate additives 18 embedded therein.

Resin matrix 14 is composed of a resin material having fumed silica (commonly sold under the trade name "Cab-O-Sil") therein. Advantageously, 2% to 10% (by weight) thereof is employed with about 8% fumed silica being preferred. While fumed silica is used it is contemplated that any material having similar thixotropic properties and tribological characteristics such as wear resistance and hardness could be used in place of fumed silica. An inner layer 20 of resin matrix 14 exists at inner surface 12, thereby greatly, due to the hardness imparted thereto by the fumed silica present therein. The resin material may be made to be either translucent or colored, as desired.

Continuous filament material 16 is helically embedded within resin matrix 14 to thereby add to the toughness (i.e., durability) of composite sleeve 10.

Advantageously, filament windings 26 each have a round filament cross-section 30, thereby forming a series of rounded filament surfaces 32 at or near inner surface 12. Inner layer 20 of resin matrix 14 and the series of rounded filament surfaces 32 at or near inner surface 12 together actually define the totality of inner surface 12. In fact, the combination of the fumed silica in resin matrix 14 and rounded filament surfaces 32 permits the surface finish of inner surface 12 to be an arithmetic average roughness (Ra) of about 25.mu.in or greater, whereas normal metallic or gel coated cylinders specify an Ra of less than 10.mu.in.

Advantageously, continuous filament material 16 is a fiberglass material. Fiberglass offers advantages of good hardness, generally good durability, a round cross-section and translucency. Some possible choices for particulate additives 18 are polytetrafluoroethylene (PTFE), glass beads, fine ground silica, etc. or a combination thereof. PTFE, commonly sold under the trade mark "Teflon". Glass beads each offer a rounded surface and good hardness. Fine ground silica helps increase hardness.

Figure 3:
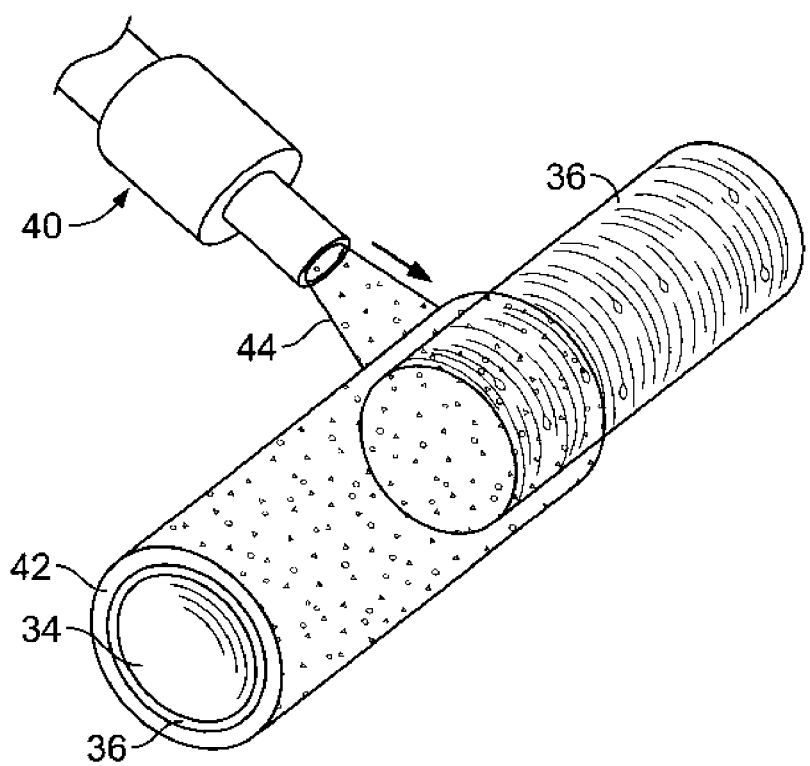
Figure 4:
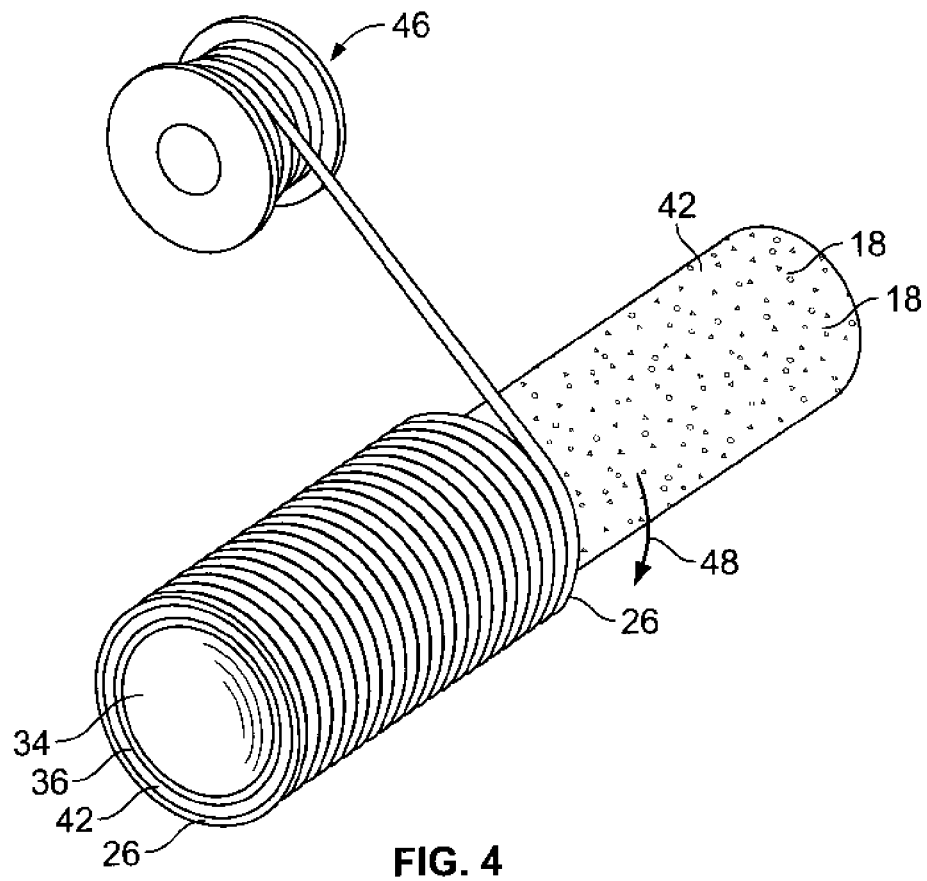
Figure 5:
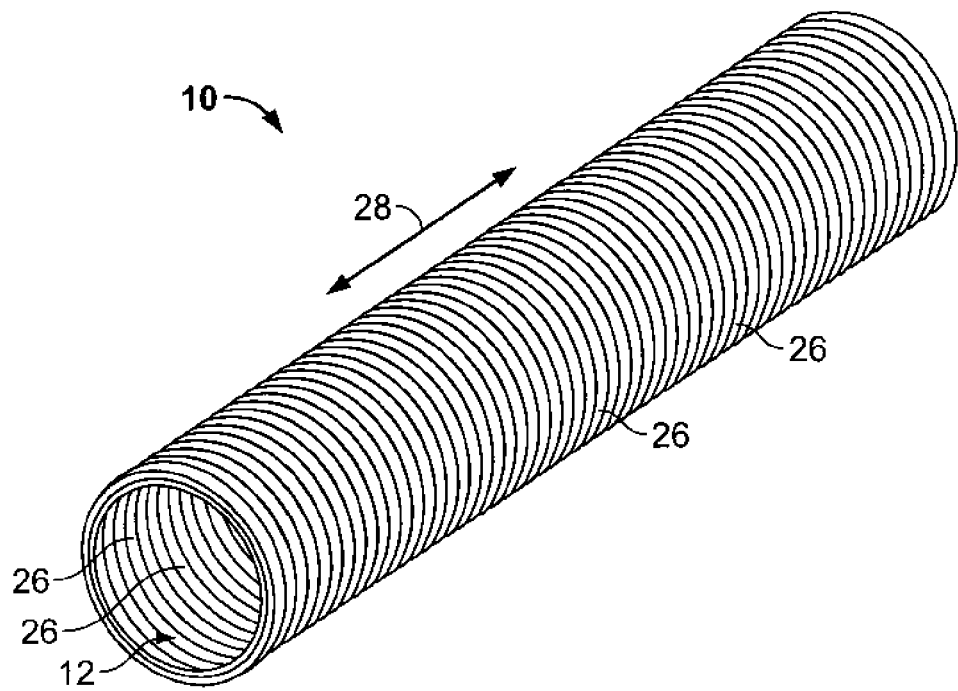
FIG. 5 is a perspective view of a completed hybrid bearing cylinder produced by employing the steps illustrated in FIGS. 2-4.

FIGS. 2-5 together illustrate various steps in the production of composite sleeve 10, including a perspective view of the finished product (FIG. 5). As set forth in FIG. 2, a highly polished mandrel 34 is provided to act as a mold for inner surface 12. Mandrel 34 advantageously has an arithmetic average roughness (Ra) of no more than about 10 .mu.in. To help achieve the desired level of roughness and promote easy release thereof from the finished product, mandrel 34 is chrome plated.

The bore surface finish of the composite cylinder 10 is primarily a reflection of the mandrel surface finish. The normal bore surface finish of the composite cylinder 10 ranges from 10 Ra to 25 Ra microinches. The surface finish can even be higher and can simulate a microscopic "orange peel" surface profile resulting in less adhesion friction without adversely affecting the seal life as would be the case with bores of metallic cylinders.

To further aid in the release thereof from the finished product, mandrel 34, as shown in FIG. 1, is desirably initially coated with a release agent 36 supplied by a release agent applicator 38 (shown schematically). Additives can be provided within release agent 36 that will adhere to inner surface 12. PTFE can, for example, be used as such an additive. The coefficient of friction can further be reduced by the migration (transfer) of the mandrel release material from the mandrel to the composite bore surface. Above normal amounts of low friction additives in the mandrel release material such as PTFE particulates can further reduce the friction at the bore surface by the migration process.

In FIG. 3, a resin source 40 of an appropriate resin material 42 and an associated resin applicator 44 are provided. Resin applicator 44 is advantageously a trowel applicator, permitting the application of a controlled, even thickness of resin material 42 on mandrel 34. Resin material 42 is applied, desirably in a form of a paste, upon mandrel 34. Resin material 42 is troweled substantially evenly over entire mandrel 34, preferably to a thickness of about ⅛ inch.

As illustrated in FIG. 4, a filament source 46 of continuous filament material 16 is supplied and via which filament windings 26 that are formed substantially transversely of primary direction 26. (Mandrel 34 could be rotatably driven, as schematically shown via arrow 48, to promote the winding of continuous filament material 16 thereon.) Filament windings 26 displace and otherwise become embedded in resin material 42 during this step. After a suitable number of filament windings 26 have been formed along the entire length of mandrel 34 in resin material 42, continuous filament material 16 is cut (not shown) and, desirably, excess resin material 42 is wiped (not shown) from the outside of now-formed composite sleeve 10 before resin material 42 has an opportunity to cure.

Once resin material 42 cures, mandrel 34 is then removed from composite sleeve 10 to reveal the finished product shown in FIG. 5.

Composite sleeve 10 can be used in combination with a metallic jacket 100 to form hybrid bearing cylinder 102, as shown, for example, in FIG. 7. Metallic jacket 100 includes an inner surface 104, an outer surface 106 and first and second ends 108, 110. Composite sleeve 10 includes inner bearing surface 12 and machined outer surface 112. Outer surface 112 of composite sleeve 10 can be machined using a lathing process so that the outer diameter of composite sleeve 10 is the same as or slightly greater than the inner diameter of metallic jacket 100 to allow for the metallic jacket 100 to be positioned around and secured to composite sleeve 10 to form hybrid bearing cylinder 102.

The outside diameter of the composite sleeve 10 can be machined to give the desired fit between the bore of the outer metallic jacket 100 and the outer diameter of the inner composite sleeve 10. Normally there will be a slight interference fit for a press fit assembly. In situations where the composite sleeve 10 is bonded to the outer metallic jacket 100 the outside diameter of the composite sleeve would be slightly less than the metallic jacket inside diameter to allow the proper bond joint thickness.

Composite sleeve 10 includes first and second ends 114, 116, as shown, for example, in FIG. 7. The overall length of composite sleeve 10 is shorter than metallic jacket 100 such that first and second ends 114, 116 of composite sleeve 10 are set in from first and second ends 108, 110 of metallic jacket 100. This arrangement allows metallic jacket 100 to be either be secured to end caps 118, 120 by use of welds 122, as shown in FIG. 7 or by threads 124, as shown in FIG. 9 for example.

Use of composite sleeve 10 in combination with metallic jacket 100 provides lower seal wear and friction characteristics of composite sleeve 10 when used with a metallic cylinder 100. Metallic cylinder 100 can be made from steel, aluminum or stainless steel. Hybrid bearing cylinder 102 reduces the cost of surface preparation of the metallic cylinders used for fluid power, pneumatic and hydraulic cylinder applications because inner bearing surface 12 is already smooth due to the manufacturing process of the composite sleeve 10.

Use of composite sleeve 10 in combination with metallic jacket 100 provides corrosion resistance to the bore surface allowing other non-compressible fluids, such as water, to be used other than conventional hydraulic fluids, and the design results in an overall weight reduction in the cylinder. The hybrid bearing cylinder 102 incorporates the strength and stiffness of metal cylinders and incorporates the bearing surface benefits of the composite sleeve material 10. Use of hybrid bearing cylinder 102 reduces the overall geometric size of the cylinder as compared with an all composite cylinder.

With the additional strength of hybrid bearing cylinder 102 over metal cylinders the pressure rating of non-repairable metallic cylinders used for low pressure hydraulic applications can be increased for 500 psig to 1500 psig applications.

End caps 118, 120 are designed to be secured to hybrid bearing cylinder 102 to provide an end seal, as shown, for example, in FIGS. 7 and 9. Depending upon the application, end caps 118, 120 may or may not include a central aperture 126 to permit the passage of a rod 128 used in combination with a piston 130, as shown, for example, in FIG. 12. In the provided examples of the disclosure, end caps 118, 120 include an end wall 132 and an annular side wall 134.

Annular side wall 134 of end caps 118, 120 includes a first annular recess 136 positioned to lie near first and second ends 108, 110 of metallic jacket 100, as shown, for example, in FIG. 7. Metallic jacket 100 can either be welded to side wall 134 of end caps 118, 120 or first annular recess 136 can include threads 124 that engage corresponding threads formed on the inner surface 104 of metallic jacket 100, as shown, for example, in FIG. 9.

End caps 118, 120 also include a second annular recess 138 that is positioned to lie near first and second ends 114, 116 of composite sleeve 10, as shown, for example, in FIG. 7. Second annular recess 138 includes an annular groove 140 that is adapted to accept an o-ring seal 142 to seal against the inner bearing surface 12 of composite sleeve 10.

Figure 10:
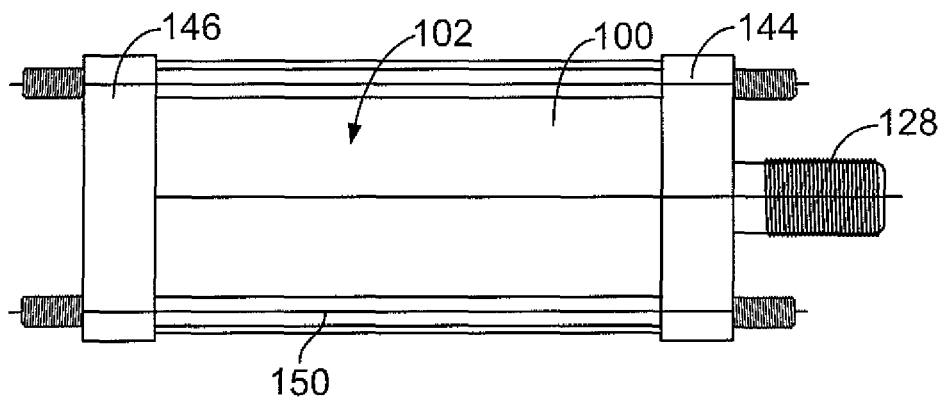
FIG. 10 is a side elevational view of a hybrid bearing cylinder secured to a pair of end caps by a series of threaded rods that extend from end cap to end cap.
Figure 11:
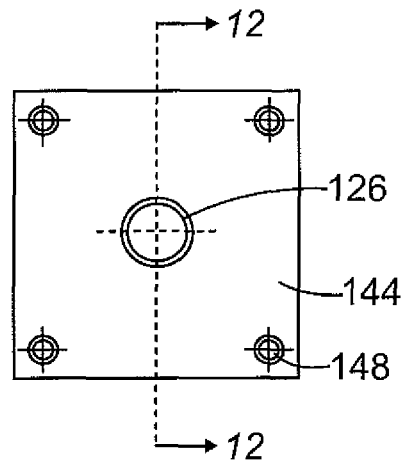
FIG. 11 is an end view of the hybrid bearing cylinder of FIG. 10.
Figure 12:
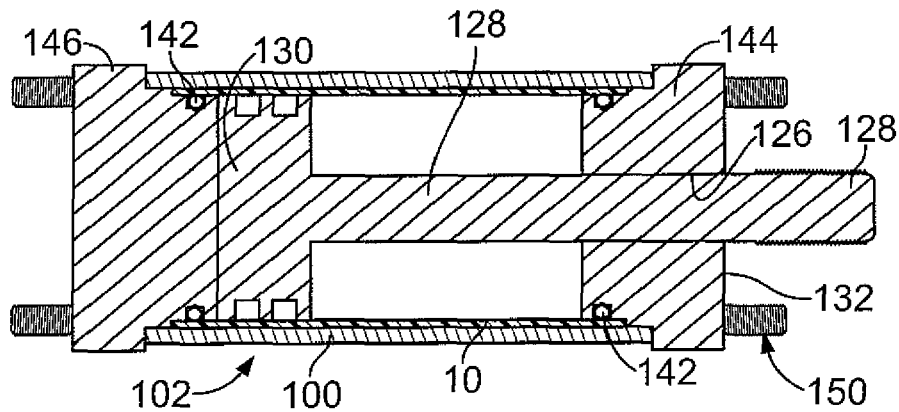
FIG. 12 is a cross section of the hybrid bearing cylinder taken along line 12-12 of FIG. 11 showing the composite bearing cylinder positioned within the metallic jacket and also showing the metallic jacket being secured to a pair of end caps by elongated threaded rods that extend from end cap to end cap.
Figure 13:
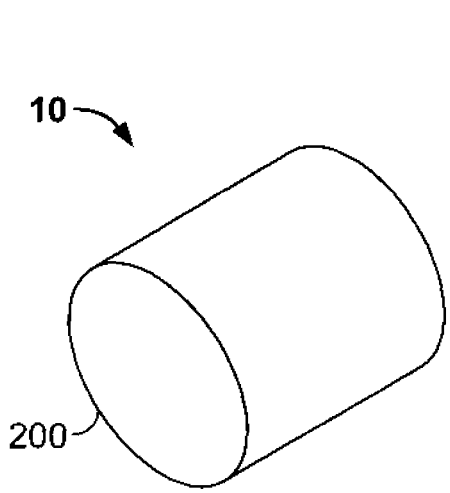
FIG. 13 is a perspective view of the position sensing composite cylinder.
Figure 14:
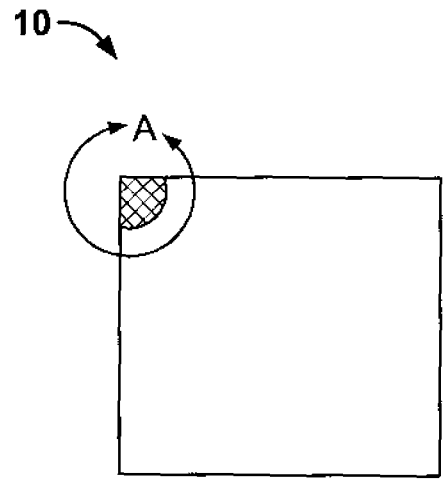
FIG. 14 is a side elevational view of the composite cylinder of FIG. 13.

End caps 144, 146 of hybrid bearing cylinder 102 of FIGS. 10-12 include a series of apertures 148 adapted to accept tie rods 150 that extend from end cap 144 to end cap 146 to compress end caps 144, 146 against hybrid bearing cylinder 102. Use of tie rods 150 replaces the use of welds or threads to secure end caps 144, 146 to hybrid bearing cylinder 102. Use of welds or threads eliminate the need to use tie rods. Swaging, while not illustrated in the figures, can also be used to secure end caps 118, 120 to hybrid bearing cylinder 102.

Metallic jacket 100 can be assembled with composite sleeve 10 by press fitting the two components together. Another method for assembling metallic jacket 100 to composite sleeve 10 is by thermally expanding the metallic jacket 100 prior to inserting composite sleeve 10. Alternatively, metallic jacket 100 can be bonded to composite sleeve 10 by use of an adhesive or can be metal formed by use of swaging, roll forming, or drawing processes. Use of metallic jacket 100 with composite sleeve 10 provides a sealing barrier for the composite sleeve 10 for applications that require the containment of gasses such as helium.

Hybrid bearing cylinder 102 with the position sensing components shown in FIGS. 13-18 can be used for piston positioning sensing, piston velocity control, cycle counting in fluid power hydraulic cylinders. Use of this arrangement provides cost savings, provides for longer piston seal life and provides for lighter, less cumbersome cylinder assemblies. Hybrid bearing cylinder 102 could also be used for linear sensing devices which incorporate positioning sensing composite sleeves within metallic jackets.

Composite sleeve 10 of hybrid bearing cylinder 102 may also include a thin cylindrical layer of a resistive (or semiconductive) material located within the wall of the dielectric composite sleeve 10, as shown, for example, in FIGS. 13-18. The location of the resistive (or semi-conductive) layer in the wall of the cylinder sleeve 10 relative to the bore surface 12 and the thickness and the resistivity of the resistive material varies depending on the requirements of the electronic positioning sensor. Examples of sensor components that can be used in connection with the cylinders include but not limited to sensors requiring resistivity, sensors requiring capacitance, and sensors requiring varying magnetic field.

In one embodiment, a multiple of thin resistive layers may be positioned at various locations within the wall of the composite sleeve 10. The resistive film in this embodiment is located between dielectric layers in the wall of the composite sleeve 10. In another embodiment, the composite sleeve 10 incorporates an electromagnetic shielding material within the sleeve wall or at the outer surface of the composite sleeve 10 to prevent undesirable electrical interference with the positioning sensor device.

The resistive material used with the dielectric composite sleeve 10 may be in the form of a polymeric gel coat formulated with the desirable amount of conductive filler such as carbon black to give the desired resistivity. The polymeric gel coat may be applied (but not limited to) during the manufacturing process at the desired location within the composite wall by normal gel coating techniques such a spraying or contact application. In yet another embodiment, the resistive material may also take the form of a resistive conductive polymeric thin film or metallic film that is wrapped onto the laminated composite sleeve 10 at the desired location within the wall of the composite sleeve 10.

In yet another embodiment, the resistive material may also take the form of conductive fibers such a carbon fiber that is filament wound into the wall of the composite sleeve 10 during the filament winding process. The resistive material is not limited to the above but may take other forms to meet the intent of this invention.

The present disclosure also relates to fluid power capacitive positioning sensor cylinders. In this embodiment, an area variation type capacitor is made by integrating a conductive thin foil between dielectric laminates in the wall of the composite sleeve 10, as shown, for example, in FIG. 17. The foil forms a symmetric trapezoid orientated about the axis of the cylinder. The taper in the foil relative to the axial direction of the cylinder bore provides a changing exposed area to the piston as the piston moves in the cylinder. Normally the piston is ground while a voltage is applied to the foil. The moving piston would thereby create a changing capacitance which would be proportional to the changing capacitance area.

By tuning the capacitance at retract and extend positions of the fluid power cylinder and knowing the capacitance change from retract to extend position is a linear function, the position of the piston can be electronically monitored. The dielectric composite tube material (located between the conductive foil and the bore surface) and the relatively small distance between the bore surface and the piston OD serves as a dielectric spacer between the conductive surfaces of the capacitors.

Figure 18:
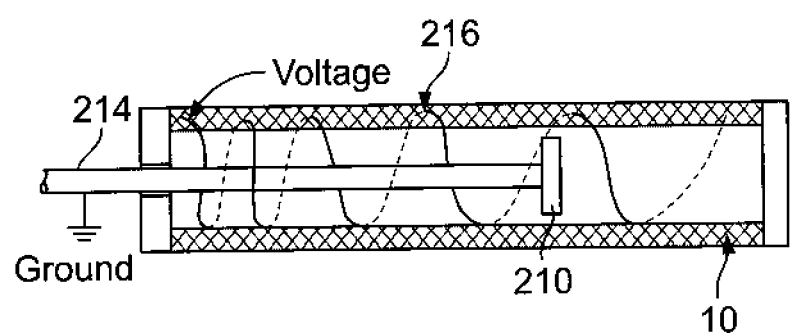
FIG. 18 is a cross-sectional view of a composite cylinder having a linear motion transducer.

The present disclosure also relates to fluid power electromagnetic position sensor cylinders, as shown, for example, in FIG. 18. In this embodiment, a conductive wire is wound symmetrically at a changing wind angle about the axis of the composite sleeve 10. The wire is imbedded within the dielectric laminate of the wall of the composite sleeve 10 and preferably located near the bore surface and the piston within the cylinder is electrically grounded. Due to the magnetic field density changing with axial movement of the piston, the position of the piston is proportional to the change in electromagnetic field current, thereby providing a means for electronically monitoring the relative position of the piston.

Figure 17:
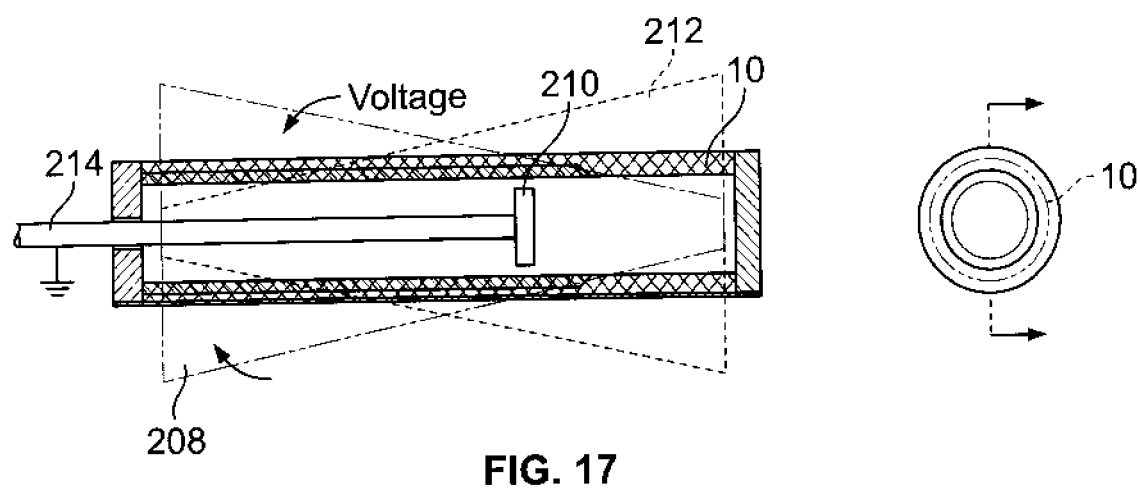
FIG. 17 is a cross-sectional view of a composite cylinder having a capacitive sensor.

FIG. 17 shows a capacitive sensor formed with the composite sleeve 10. The cylinder includes a tapered conductive foil electrode that positioned to lie around the composite sleeve 10. A charge is placed on the foil electrode and the metallic piston and shaft are grounded. The tapered foil provides a changing face area as the piston moves axially producing a change in capacitance.

FIG. 18 shows a linear motion transducer formed of a variable wound coil that is wound within the dielectric composite sleeve 10. As with FIG. 17, a charge is placed on the coil wire and the conductive piston and rod are grounded. The coil windings vary in density across the length of the composite sleeve 10 to provide a change is capacitance.

Figure 15:
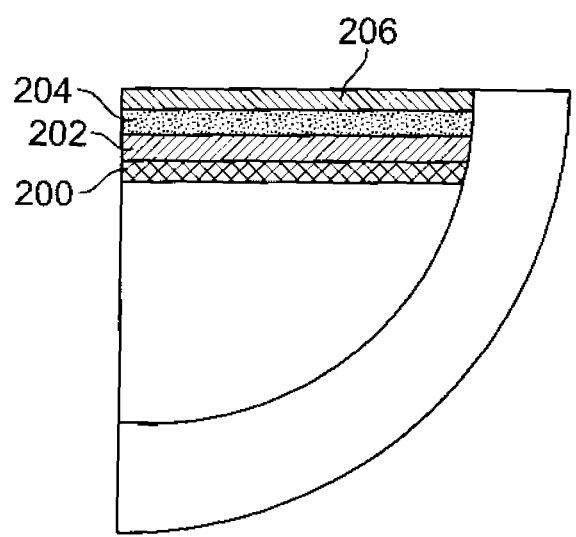
FIG. 15 is an exploded view of section A of FIG. 14 showing the different layers of the composite cylinder.
Figure 16:
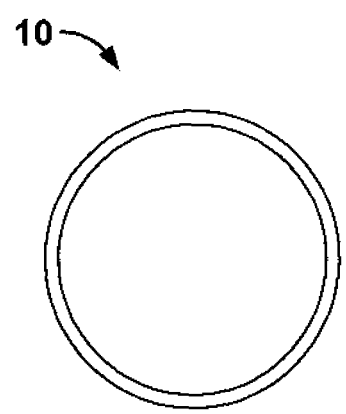
FIG. 16 is a front elevational view showing the layers of the cylinder.

FIGS. 13-16 illustrate a composite sleeve 10 including the sensing capabilities. FIG. 15 includes a composite liner 200, a resistive layer 202, a dielectric layer 204 and an electromagnetic shield 206. FIG. 17 shows composite sleeve 10 including a trapezoidal foil layer 208. Foil layer 208 is tapered to provide a changing face area as piston 210 moves axially to produce a change in capacitance. Optionally, a multi-tapered electrode 212 can also be used. In this embodiment, piston 210 and shaft 214 are grounded and a voltage is applied to the conductive foil electrode.

FIG. 18 shows a composite sleeve 10 including sensing capabilities. FIG. 18 shows the use of a variable wound coil wire 216 or carbon filament wound around and embedded in the resin of the wall of the composite sleeve 10. Voltage is applied to wire 216 and piston 210 and rod 214 are grounded. This system can act as a linear motion transducer. The wire 216 can be variably wound into the dielectric composite sleeve 10.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A hybrid bearing cylinder comprising
a composite sleeve having a continuous inner bearing surface and an outer surface, the inner bearing surface defining a primary bearing direction along an axis of the cylinder,
a resin matrix composed of a resin material, the resin material at least partially at the inner bearing surface,
a filament material embedded within the resin matrix,
a jacket positioned around the composite sleeve and having a inner surface that is positioned to lie near the outer surface of the composite cylinder, wherein the ends of the jacket extend further than the ends of the composite sleeve so that the jacket can be coupled with an end cap.

2. The hybrid bearing cylinder of claim 1 wherein the ends of the jacket are threaded so that the jacket can be coupled to a end cap having corresponding threads.

3. The hybrid bearing cylinder of claim 1 wherein the jacket is metallic and can be welded to a metallic end cap.

4. The hybrid bearing cylinder of claim 1, wherein the jacket is coupled to the composite sleeve by a press fit.

5. The hybrid bearing cylinder of claim 1, wherein the jacket is bonded to the composite sleeve by use of an adhesive.

6. The hybrid bearing cylinder of claim 1, wherein the jacket is thermally expanded prior to positioning the composite sleeve within the jacket and then thermally contracted to form a resistance fit.

7. A hybrid bearing cylinder having position sensing capabilities comprising
a dielectric composite sleeve having a continuous inner bearing surface and an outer surface,
the inner bearing surface defining a primary bearing direction along an axis of the cylinder,
a resin matrix composed of a resin, the resin at least partially lying at the inner bearing surface, at least a portion of the resin matrix is embedded with a semi-conductive material,
a filament material embedded within the resin matrix,
a metallic jacket positioned around the composite sleeve and having a inner surface that is positioned to lie near the outer surface of the composite cylinder.

8. The hybrid bearing cylinder of claim 7 wherein the semi-conductive material is in the form of conductive fibers that are filament wound during manufacture of the dielectric composite sleeve.

9. The hybrid bearing cylinder of claim 8, wherein the conductive fibers include carbon fiber.

10. The hybrid bearing cylinder of claim 7, wherein the semi-conductive material is positioned between the inner bearing surface and the outer surface of the dielectric composite sleeve.

\* \* \* \* \*